United States Patent
Khazanov et al.

(10) Patent No.: US 10,223,902 B2
(45) Date of Patent: Mar. 5, 2019

(54) METHODS AND SYSTEMS FOR OPERATING A POINT DEVICE INCLUDED IN A SYSTEM OF POINT DEVICES

(71) Applicant: Robert Bosch GmbH, Stuttgart (DE)

(72) Inventors: Alex Khazanov, Rochester, NY (US); Othmane Bennis, Rochester, NY (US); Satheesh Kunjuraman, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 15/274,920

(22) Filed: Sep. 23, 2016

(65) Prior Publication Data

US 2017/0092112 A1    Mar. 30, 2017

Related U.S. Application Data

(60) Provisional application No. 62/232,612, filed on Sep. 25, 2015.

(51) Int. Cl.
| | |
|---|---|
| *G08B 29/14* | (2006.01) |
| *G08B 25/00* | (2006.01) |
| *H04L 29/08* | (2006.01) |

(52) U.S. Cl.
CPC .......... *G08B 29/14* (2013.01); *G08B 25/007* (2013.01); *G08B 25/008* (2013.01); *H04L 67/12* (2013.01)

(58) Field of Classification Search
CPC ...... G08B 29/14; G08B 29/16; G08B 25/007; G08B 25/008; H04L 67/12
See application file for complete search history.

(56) References Cited

U.S. PATENT DOCUMENTS

| | | | | |
|---|---|---|---|---|
| 5,543,778 A | * | 8/1996 | Stouffer | B60R 25/102 340/425.5 |
| 5,621,662 A | * | 4/1997 | Humphries | G05B 15/02 340/3.1 |
| 5,746,203 A | * | 5/1998 | Hood, Jr. | A61B 5/00 600/300 |
| 5,781,108 A | * | 7/1998 | Jacob | G08B 15/002 340/517 |
| 6,624,750 B1 | | 9/2003 | Marman et al. | |
| 7,019,615 B2 | | 3/2006 | Denison et al. | |
| 7,196,623 B1 | * | 3/2007 | Wang | G08B 21/24 340/10.2 |
| 7,528,711 B2 | | 5/2009 | Kates | |
| 8,194,592 B2 | | 6/2012 | Kore et al. | |
| 8,730,018 B2 | * | 5/2014 | Besore | G06Q 50/06 340/13.25 |

(Continued)

*Primary Examiner* — Nay Tun
(74) *Attorney, Agent, or Firm* — Michael Best & Friedrich LLP

(57) ABSTRACT

Methods and systems for operating a point device included in a system of point devices. One method includes transmitting a query, with a transceiver included in the point device, to at least one device external to the point device for system state information and receiving, with the transceiver, a response from at least one device external to the point device in response to the query. The method also includes determining, with an electronic processor included in the point device, a current state of the system of point devices based on the received response and automatically modifying, with the electronic processor, operation of the point device based on the current state of the system of point devices.

20 Claims, 5 Drawing Sheets

(56) References Cited

U.S. PATENT DOCUMENTS

| | | | |
|---|---|---|---|
| 9,077,183 B2 | 7/2015 | Thomas et al. | |
| 9,172,623 B1 * | 10/2015 | Micali | H04L 67/12 |
| 2003/0090374 A1 * | 5/2003 | Quigley | G08B 19/005 |
| | | | 340/506 |
| 2004/0212678 A1 | 10/2004 | Cooper et al. | |
| 2005/0134450 A1 * | 6/2005 | Kovach | G08B 25/00 |
| | | | 340/506 |
| 2006/0176167 A1 * | 8/2006 | Dohrmann | G08B 25/001 |
| | | | 340/506 |
| 2008/0094202 A1 * | 4/2008 | Martin | G08B 13/1968 |
| | | | 340/506 |
| 2008/0224862 A1 * | 9/2008 | Cirker | G08B 13/19652 |
| | | | 340/540 |
| 2010/0245073 A1 * | 9/2010 | Addy | G08B 25/008 |
| | | | 340/539.1 |
| 2011/0054833 A1 * | 3/2011 | Mucignat | G06F 3/017 |
| | | | 702/150 |
| 2013/0257611 A1 * | 10/2013 | Lamb | G08B 25/008 |
| | | | 340/501 |
| 2014/0006823 A1 * | 1/2014 | Lamb | H02J 13/0086 |
| | | | 713/323 |
| 2015/0077254 A1 * | 3/2015 | Leyden | G08B 13/1454 |
| | | | 340/572.1 |
| 2015/0222517 A1 * | 8/2015 | McLaughlin | H04W 4/70 |
| | | | 713/156 |
| 2016/0189527 A1 * | 6/2016 | Peterson | G08B 25/008 |
| | | | 340/541 |

* cited by examiner

METHODS AND SYSTEMS FOR OPERATING A POINT DEVICE INCLUDED IN A SYSTEM OF POINT DEVICES

RELATED APPLICATIONS

This application claims priority to U.S. Provisional Application No. 62/232,612 filed Sep. 25, 2015, the entire content of which is herein incorporated by reference.

FIELD

Embodiments of the invention relate to methods and systems for operating a point device included in a system of point devices.

BACKGROUND

Security systems, home and building automation systems, and other similar systems typically include a master controller and a plurality of point devices. The point devices monitor a premises (for example, a building). The point devices may communicate with the master controller over a wired or wireless connection. The master controller may generate and transmit signals to the point devices that control how the point devices operate. However, as security systems include more and more point devices, the complexity of the master controller similarly increases, which may introduce delays and errors and may limit the versatility of the master controller and the point devices.

SUMMARY

Accordingly, embodiments of the invention provide methods and systems for operating a point device included in a system of point devices. The point device is configured to automatically determine a current state of the system of point devices by querying one or more devices external to the point device for system state information. The point device automatically modifies operation based on the received system state information.

For example, one embodiment of the invention provides a security system. The security system includes a point device included in a system of point devices. The point device includes an electronic processor, wherein the electronic processor is configured to transmit a query to at least one device external to the point device for system state information and receive a response from the at least one device external to the point device to the query for system state information. The electronic processor is also configured to determine a current state of the system of point devices based on the response and automatically modify operation of the point device based on the current state of the system of point devices. The electronic processor is also configured to track a number of changes in the current state of the system of point devices and compare the number of changes in the current state of the system of point devices to a predetermined threshold. When the number of changes in the current state of the system of point devices exceeds the predetermined threshold, the electronic processor is configured to automatically trigger a malfunction response. When the number of changes in the current state of the system of point devices does not exceed the predetermined threshold, the electronic processor is configured to automatically modify the operation of the point device based on the current state of the system of point devices.

Another embodiment of the invention provides a method of operating a point device included in a system of point devices. The method includes transmitting a query, with a transceiver included in the point device, to at least one device external to the point device for system state information and receiving, with the transceiver, a response from at least one device external to the point device in response to the query. The method also includes determining, with an electronic processor included in the point device, a current state of the system of point devices based on the received response and automatically modifying, with the electronic processor, operation of the point device based on the current state of the system of point devices.

Another embodiment of the invention provides a computer readable medium that includes instructions that, when executed by an electronic processor, causes the electronic processor to perform a set of functions. The set of functions includes detecting an event with a point device included in a system of point devices and determining how to process the event for each of a plurality of states of the system of point devices. When the event is not processed the same for each of the plurality of states of the system of point devices, the set of functions includes transmitting a query from the point device to at least one device external to the point device for system state information, receiving a response from the at least one device external to the point device to the query for system state information, determining a current state of the system of point devices based on the response, and processing the event with the point device based on the current state of the system of point devices. When the event is processed the same for each of the plurality of states of the system of point devices, the set of functions includes processing the event with the point device based on a previously-identified state of the system of point devices without determining the current state of the system of point devices.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include one or more electronic processors, one or more memory modules including non-transitory computer-readable medium, one or more input/output interfaces, and various connections (for example, a system bus) connecting the components.

Figure 1:
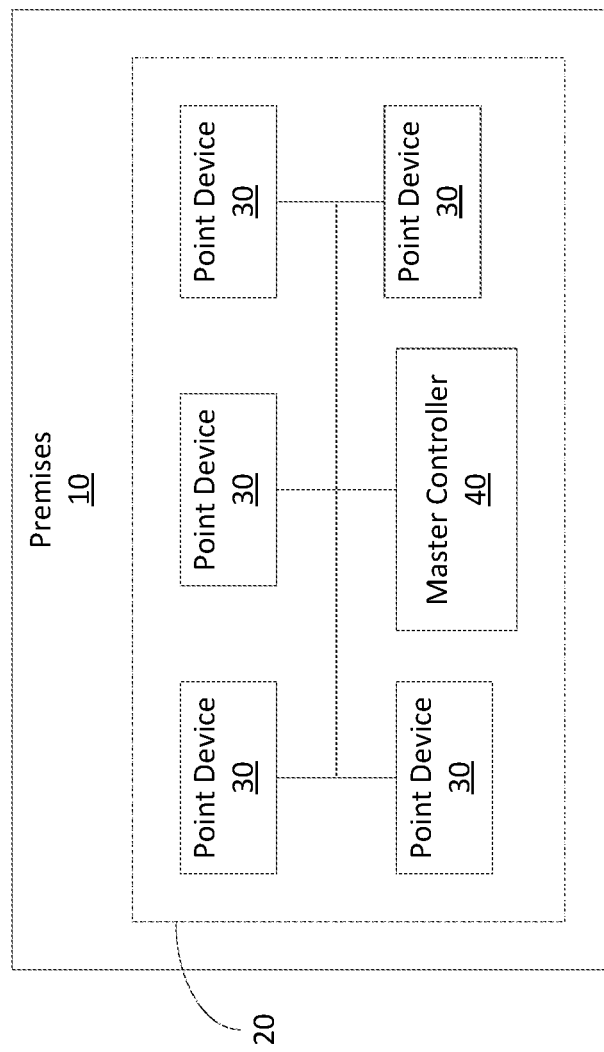
FIG. 1 schematically illustrates a premises monitored by a security system according to some embodiments.

FIG. 1 schematically illustrates a premises 10 (for example, a building) having a security system 20, such as a premises security system, a premises monitoring system, or a premises automation system. In the example illustrated, the security system 20 includes one or more point devices 30 and a master controller 50 and may be referred to as a system of point devices. The point devices 30 communicate with the master controller 40 over a wired or wireless connection. In some embodiments, the plurality of point devices 30 communicates with the master controller 40 wirelessly using, for example, ZigBee protocols. The security system 20 illustrated in FIG. 1 is provided as one example of a security system, and the embodiments described herein may be used with any type of security system and is not limited to the example security system illustrated in FIG. 1. In addition, the security system 20 may include fewer, additional, or different components than illustrated in FIG. 1. For example, the security system 20 may include more than one master controller 40.

Figure 2:
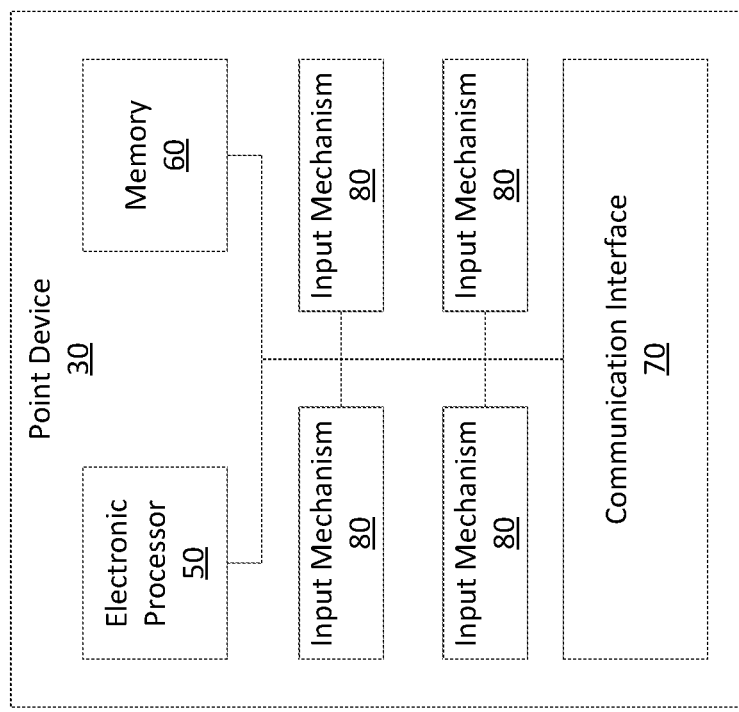
FIG. 2 schematically illustrates a point device included in the security system of FIG. 1 according to some embodiments.

FIG. 2 illustrates a point device 30 included in the system of point devices. In the example illustrated, the point device 30 includes an electronic processor 50 (for example, a microprocessor, application specific integrated circuit, or other suitable electronic device), a memory 60 (for example, one or more non-transitory computer-readable storage mediums), a communication interface 70, and one or more input mechanisms 80. The electronic processor 50, the memory 60, the communication interface 70, and the input mechanisms 80 communicate over one or more control or data connections or buses. In some embodiments, the point device 30 also includes an internal battery or other power source (not shown) that provides power to the internal components of the point device 30. Alternatively or in addition, the point device 30 may receive power through a connection to an external power source (for example, a power line extending through the premises 10).

The point device 30 illustrated in FIG. 2 is provided as one example of a point device, and the embodiments described herein may be used with any type of point device and is not limited to the example point device illustrated in FIG. 2. In addition, the point device 30 may include fewer, additional, or different components than illustrated in FIG. 2 in different configurations than illustrated in FIG. 2. For example, the point device 30 may include multiple memories 60, multiple electronic processors 50, multiple communication interfaces 70, and fewer or additional input mechanisms 80. Also, in some embodiments, the point device 30 performs functionality in addition to the functionality described herein.

The electronic processor 50 is configured to retrieve, from the memory 60, instructions and execute the instructions to perform a set of functions, including the methods described herein. The memory 60 may include combinations of different types of memory, such as read-only memory ("ROM"), random access memory ("RAM"), or another non-transitory computer readable medium. The instructions executed by the electronic processor 50 may be stored in the memory 60. The memory 60 may also store data. Accordingly, the memory 60 may store firmware, one or more applications, program data, configuration settings, option matrices, filters, rules, one or more program modules, and other executable instructions or data.

The communication interface 70 allows the point device 30 to communicate with devices external to the point device 30 (for example, receive input from and provide output to devices external to the point device 30). For example, the point device 30 may communicate with the master controller 40, other point devices included in the system of point devices, or a combination thereof through the communication interface 70. The communication interface 70 may include a port for receiving a wired connection to an external device (for example, an Ethernet cable, a universal serial bus ("USB") cable and the like), a transceiver for establishing a wireless connection to an external device (for example, over a communication network, such as the Internet, a local area network ("LAN"), a wide area network, and the like), or a combination thereof.

The input mechanisms 80 may include, for example, a motion detector, a panic button, a smoke detector, a water sensor, a flow switch, an image sensor (for example, a camera), a barometric pressure sensor, a light sensor, and the like. The input mechanisms 80 may be configured to collect data relating to the premises 10. For example, the input mechanisms 80 may include a smoke detector that detects the presence of smoke within the premises 10. Accordingly, the input mechanisms 80 may allow the point device 30 to monitor the premises 10. As described in more detail below, the point device 30 may, based on the data collected via the input mechanisms 80, report events, measured parameters, or a combination thereof to the master controller 40 (for example, a motion detected event, a fire event, a light below threshold event, a light level, a temperature, and the like).

The master controller 40 may include combinations of hardware and software, such as, for example, a second electronic processor, a second memory, and a second input/output interface. The second electronic processor, the second memory, and the second input/output interface may communicate over one or more control or data connections or buses. The basic operations and numerous variations of the second electronic processor, the second memory, and the second input/output interface are similar to those described with respect to the point device 30. Thus, further details of these aspects are not provided other than to note, as should be apparent, that the second electronic processor executes computer-readable instructions ("software") stored, for example, in the second memory.

The point devices 30 operate based, at least in part, on signals received from the master controller 40. In some embodiments, a point device 30 operates in a plurality of modes, such as a security sensor mode and an occupancy sensor mode. In the security sensor mode, the point device 30 may report detected events to the master controller 40. In contrast, in the occupancy sensor mode, the point device 30 may not report all detected events to the master controller 40 or may use different criteria to determine when to report detected events to the master controller 40. Therefore, in some embodiments, when the security system 20 (the system of point devices) is in an armed state, the point device 30 operates in the security sensor mode and, when the security system 20 is in a disarmed state, the point device 30 operates in the occupancy sensor mode.

Accordingly, the master controller 40 may be configured to generate and transmit signals to each point device 30. The generated and transmitted signals may command each point device 30 to modify its mode of operation. For example, in response to the security system 20 being set to a disarmed state, the master controller 40 may transmit a signal to a point device 30 commanding the point device 30 to switch to the occupancy sensor mode and also setting criteria reporting events or parameters. This method of sending explicit commands to a point device to modify operation of the point device is used in traditional systems.

Thus, traditionally, a master controller needed to be aware of the functions associated with each of point device included in the security system and how and when to control the operation of each point device (for example, how and when to change the mode of operation, sensitivity, and the like of each point device). This increases the complexity of the master controller because more logic is programmed into the master controller (for example, increased instructions must be stored and executed). Furthermore, as additional point devices are added to the security system, the master controller 40 needs to be updated accordingly.

Furthermore, many point devices are battery powered and are often expected to operate for years between battery replacements. To accomplish long battery life, these point devices remain in a sleep mode most of the time and often have long (for example, minutes or even hours) predefined time intervals between establishing connections with external devices (for example, a master controller). Also, in some situations, when a point device detects a condition that is reported to a master controller (for example, the point device is triggered), the point devices may go into a lockout mode to preserve battery life. While in the lockout mode, the point device does not detect or report events for a predetermined period of time (for example, several minutes) after the first detected event is detected or reported to avoid unnecessary battery drain in high traffic areas. These features limit system communication with point devices and increase the latency of responses from point devices. As a result, many point devices require added manual interaction during installation and maintenance. For example, each point device may need to be manually placed into an installation mode or a test mode during installation or maintenance. Similarly, when a master controller is configured to send specific communications to point devices, each point device must be compatible with this functionality, which limits what point devices may be added to a security system and what functions of those point devices are available.

Also, in some embodiments, the mode of operation of a point device is modified based on a command received from a master controller to reduce power consumption. For example, as noted above, some point devices are powered solely through an internal battery. Therefore, to extend the life of the battery, a point device may disable particular functionality, change the frequency of performing particular functionality, or perform a combination thereof when a security system is in a disarmed state. Accordingly, when a master controller does not send a timely command to a point device requesting a mode of operation change (for example, the master controller is malfunctioning, a signal is lost, or the point device is in a sleep mode), the point device may not be able to properly manage power consumption.

Accordingly, to address these and other technological problems with existing point devices, embodiments of the point device 30 are configured to automatically determine a current state of the security system 20 (the system of point devices) and automatically modify operation based on the determined current state. Performing this functionality at the point device 30 reduces the complexity of the master controller 40 because the master controller 40 no longer needs to transmit specific commands to each point device 30 to request changes in point device operation. Furthermore, performing this functionality at the point device 30 places less restrictions on what point device 30 may be added to the security system 20 because the point device 30 does not rely on the master controller 40 to provide these commands. Similarly, the master controller 40 is not required to be updated each time a new point device 30 is added to the security system 20 to ensure that the point device 30 receives signals controlling operation of the point device 30. Furthermore, even when the master controller 40 is not yet configured or is malfunctioning, the point device 30 may automatically modify operation as necessary, which reduces installation time and provides enhanced system reliability. Furthermore, point devices 30 powered by an internal battery may use the determined current state to automatically manage power consumption to extend battery life and device operation without being dependent on the master controller 40.

Figure 3:
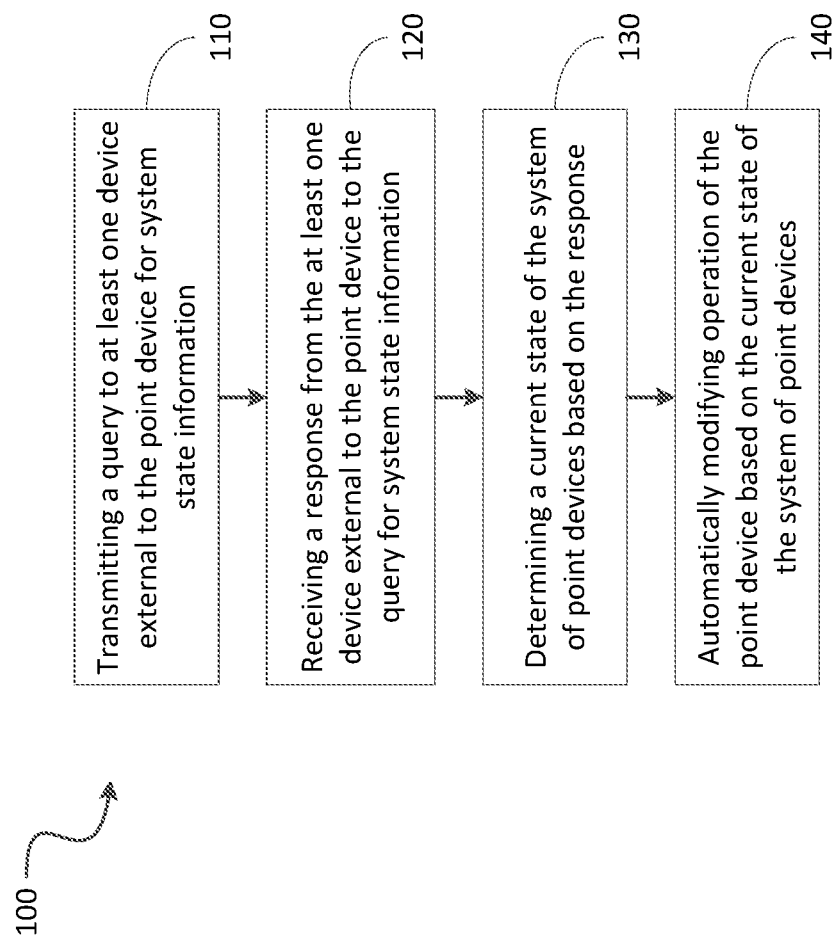
FIG. 3 is a flow chart illustrating a method of operating the security system of FIG. 1 according to some embodiments.

In particular, as noted above, the electronic processor 50 included in the point device 30 executes instructions (for example, stored in the memory 60) to operate point device 30. In particular, the electronic processor 50 executes instructions to perform the method 100 illustrated in FIG. 3. As illustrated in FIG. 3, the method 100 includes transmitting a query (for example, with a transceiver included in the point device 30) to at least one device external to the point device 30 for system state information (at block 110). The device external to the point device 30 may include the master controller 40, another point device 30 included within the security system 20 (for example, a second point device 30), or a combination thereof. In some embodiments, the point device 30 transmits a query to the at least one device external to the point device 30 periodically (for example, according to a pre-set schedule, such as every five seconds), when reporting a detected event (for example, a motion detected event), or a combination thereof. Also, in some embodiments, the point device 30 is configured to transmit a query when the point device 30 is first powered up or on any power cycle. Similarly, when the point device 30 is currently in a low-power or "sleep" mode, the point device 30 may be configured to automatically wake-up periodically, to wake-up in response to detected data, wake-up in response to a wake-up signal from another device (for example, the master controller 40), or a combination thereof. Regardless of how the point device 30 is woken up, the point device 30 may be configured to transmit the query upon waking up from a low-power or "sleep" mode.

As illustrated in FIG. 3, the method 100 also includes receiving (for example, with a transceiver) a response from the device external to the point device 30 in response to the query (at block 120). The response received from the external device may include system state information. The system state information may include an actual state of the security system 20 (the system of point devices), such as, for example, an "armed" state, a "disarmed" state, and the like. Alternatively or in addition, the system state information may include information that the point device 30 may use to determine a current state of the security system 20 (the system of point devices). For example, the system state information may include the operating mode of other point devices, an activity of other point devices, a power consumption level of the master controller 40, a time of day, a lighting condition, or a combination thereof.

The method 100 also includes determining, with the electronic processor 50 included in the point device 30, a current state of the security system 20 (the system of point devices) based on the received response (at block 130). The current state of the system of point devices may include, for example, an "armed" state, a "disarmed" state, an "installation" state, a "test" state, and the like. As mentioned above, the response to the query may include the actual state of the system or other information relating to the security system 20 (the system of point devices) that the point device 30 may use to determine a current state of the system. Also, in some embodiments, the point device 30 uses data received through the one or more input mechanisms 80 of the point device to determine a current state of the system. Alternatively or in addition, the point device 30 may determine the current state of the system based on data received from other sources. In some embodiments, the point device 30 determines the current state of the security system 20 based on a current state of another point device within the security system 20 (for example, a second point device). For example, when a second point device is in an operating mode associated with an armed state, the point device 30 may determine that the current state of the system is an armed state.

As illustrated in FIG. 3, the method 100 also includes automatically modifying, with the electronic processor 50, operation of the point device 30 based on the current state of the system of point devices (at block 140). In some embodiments, the electronic processor 50 modifies the operation of the point device 30 by modifying a mode of operation of the point device 30. For example, as noted above, the mode of operation of the point device 30 may include, for example, a security sensor mode, an occupancy sensor mode, an installation mode, a test mode, and the like. For example, when the current state of the security system 20 is a disarmed state or an armed state, the electronic processor 50 may change the mode of operation of the point device 30 to an occupancy sensor mode or a security sensor mode, respectively. In addition, the electronic processor 50 may automatically switch the mode of operation of the point device 30 to a test mode or an installation mode when the electronic processor 50 determines that the security system 20 is being installed or is undergoing maintenance (for example, the state of the system is set to an installation or test state).

Alternatively or in addition, in some embodiments, the electronic processor 50 modifies operation of the point device 30 by modifying at least one function performed by the point device 30. For example, the electronic processor 50 may disable one or more functions performed by the point device 30 to conserve power, such as by disabling a particular input mechanism 80 of the point device 30. Similarly, in some embodiments, the electronic processor 50 modifies the operation of the point device 30 by modifying at least one operating parameter of the point device 30, such as an operating parameter of an input mechanism 80 included in the point device 30. For example, a sleep interval may define how long the point device 30 remains in a sleep mode before waking up and checking for events, and the electronic processor 50 may modify this sleep interval based on the current state of the system.

Also, in some embodiments, the electronic processor 50 modifies operation of the point device 30 by using the current state of the system of point devices to determine whether to report an event to the master controller 40 or another external device. For example, when the point device 30 is currently in an occupancy sensor mode where events are reported to the master controller 40 with a two minute "lockout" period between the reports, but the electronic processor 50 determines that the system 20 is currently set to a "test" state, the electronic processor 50 may modify operation of the point device 30 to report every detected event (with no "lockout") to the master controller 40 to allow the user to verify device operation and a coverage area.

Accordingly, in some embodiments, the electronic processor 50 may perform the method 100 illustrated in FIG. 3 each time the point device 30 detects an event that may need to be reported to the master controller 40. The electronic processor 50 may then use the current state of the security system 20 to identify whether the detected event should be reported (for example, to the master controller 40 or another external device). Alternatively, when a particular event should be transmitted, regardless of the current state of the security system 20, the electronic processor 50 may bypass determining the current state.

In some embodiments, the electronic processor 50 determines whether or how to modify operation of the point device 30 based on other detected or computed data in addition to the current state of the security system 20. For example, when the electronic processor 50 determines that the security system 20 is in a "perimeter armed" state and the point device 30 is not part of that perimeter protection (and, therefore, is in "occupancy sensor" mode) but motion has not been detected for a predetermined period of time and the environment surrounding the point device 30 is dark (for example, no light is detected by the point device 30), the electronic processor 50 may automatically modify the mode of operation of the point device 30 to a security sensor mode.

Also, in some embodiments, the electronic processor 50 tracks the duration of the current state of the security system 20, a number of changes in the state of the security system 20 over a predetermined period of time, or a combination thereof. For example, when the state of the security system 20 has cycled between an armed state and a disarmed state more than a predetermined number of times or more than a predetermined number of times during a predetermined period of time, this may be a sign that the security system 20 or a portion thereof is malfunctioning or being tampered with. In some embodiments, such a situation triggers the electronic processor 50 to execute a malfunction response. The malfunction response may include, for example, maintaining a current operation of the point device, performing diagnostics on the system of point devices, notifying users via one or more local or remote mechanisms, switching to a new master controller, or a combination thereof. Accordingly, in this situation, the electronic processor 50 may not modify operation, perform diagnostics, report events to a different device (for example, a backup master controller), or perform a combination thereof.

As noted above, the current state of the security system 20 may be detected in response to different triggers. A trigger may include, for example, regularly scheduled check-in intervals, randomized check-in intervals, the detection of an event, the receipt of a wake-up signal from an internal sensor or another device, or a combination thereof. Using any of the triggers set for a specific point device 30 may provide enhanced system resource availability and minimize reporting latency. In some embodiments, a single trigger set for a specific point device 30 may accomplish the same result.

In some embodiments, when the point device 30 is a low-power point device 30, the electronic processor 50 is configured to determine the current state of the security system 20 at predefined time intervals (for example, every five minutes or every two hours) to preserve battery life (for example, based on remaining battery life, battery size, battery cost, and the like). However, in these situations, such a low-power point device 30 may not switch from the occupancy sensor mode to the security sensor mode in time to detect a condition due to the infrequent system communication.

Figure 4:
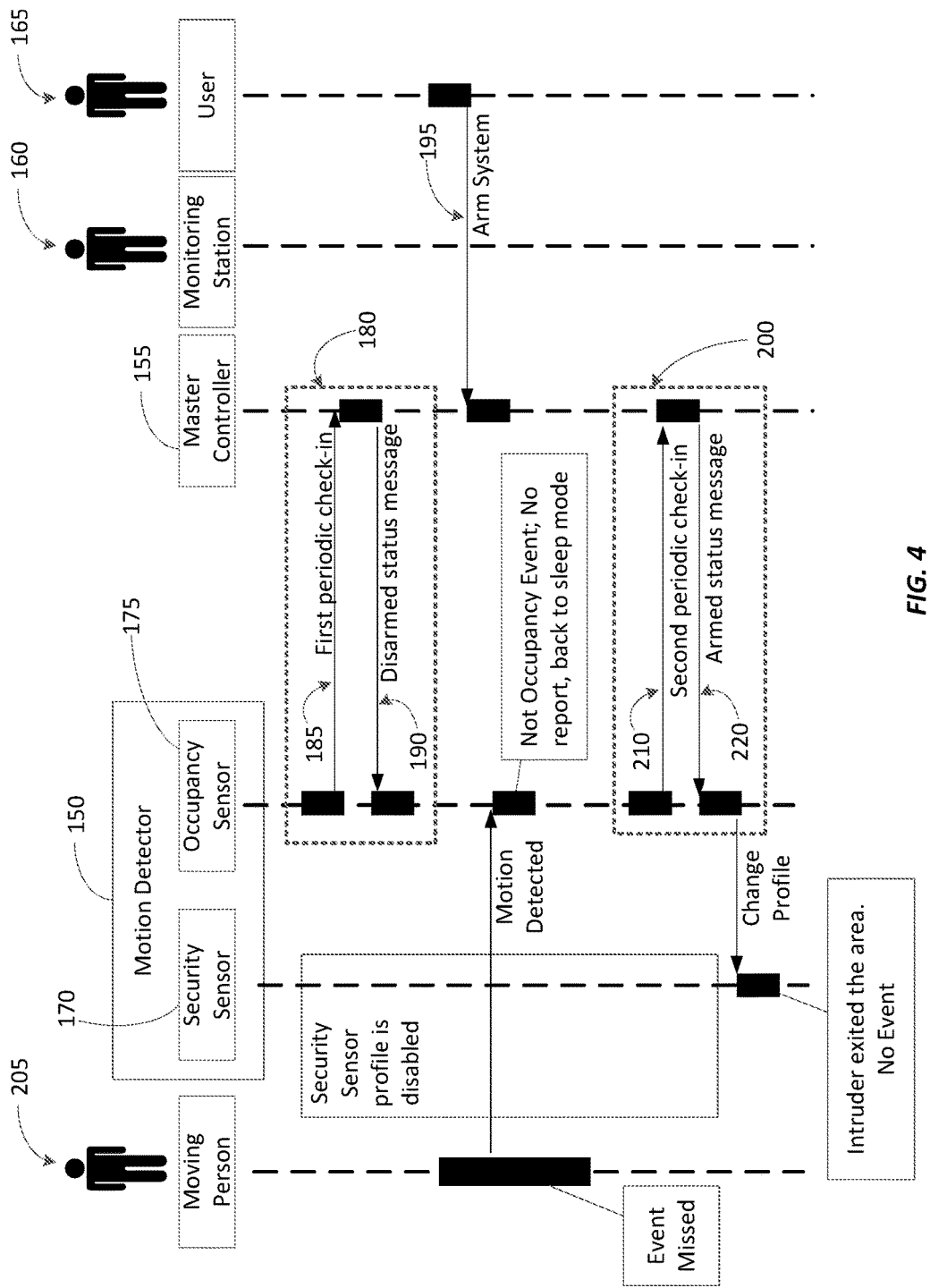
FIGS. 4 and 5 are sequence diagrams illustration operation of a point device.

For example, FIG. 4 is a sequence diagram illustrating operation of a point device 30, in particular a motion detector 150. As schematically illustrated in FIG. 4, the motion detector 150 includes a security sensor 170 and an occupancy sensor 175. The security sensor 170 and the occupancy sensor 175 may be implemented as physical or logical modules or partitions, or as states of the same device, module, or partition. In some embodiments, the security sensor 170 and the occupancy sensor 175 may be enabled or disabled based on the current state of a security system that includes the master controller 155 and the motion detector 150. As illustrated in FIG. 4, the security system may be controlled through a monitoring station 160, which may allow a user 165 to set a state of the security system.

As illustrated in FIG. 4, at a first predefined time interval 180, the motion detector 150 transmits a first periodic check-in 185 to an external device, such as the master controller 155. When the security system is in a disarmed state (as set through the monitoring station 160 by the user 165, which may be included in the master controller 155 or separate from the master controller 155), the master controller 155 transmits a disarmed status message 190 to the motion detector 150 in response to the first periodic check-in 185. Therefore, the motion detector 150 remains in an occupancy sensor state (for example, the occupancy sensor 175 remains enabled and the security sensor 170 remains disabled).

After a first predefined time interval 180, the user 165 changes the current state of the system from a disarmed state to an armed state (for example, through an arm system operation or signal 195 provided to the monitoring station 160). After the user 165 arms the system but before a second predefined time interval 200, a moving person 205 is detected by the occupancy sensor 175 included in the motion detector 150. However, the motion from the moving person 205 is not reported to the master controller 155 because the motion detector 150 is in the occupancy sensor mode and the detected signal matches a security profile not an occupancy profile, and, therefore, the motion is discarded by the occupancy sensor 175.

Therefore, at the second predefined time interval 200, the motion detector 150 transmits a second periodic check-in 210 to the master controller 155. In response to the second periodic check-in 210, the master controller 155 transmits an armed status message 220 to the motion detector 150. In response to the armed status message 220, the electronic processor included in the motion detector 150 changes the operating mode of the motion detector 150 from a disarmed state to an armed state (for example, the security sensor 170 is enabled and the occupancy sensor 175 is disabled). When the motion detector 150 changes to the armed state, the moving person 205 may have already left the premises 10. Therefore, in this situation, the detected moving person 205 is not reported (for example, the user 165 is not informed of the moving person 205, such as through the monitoring station 160).

Figure 5:
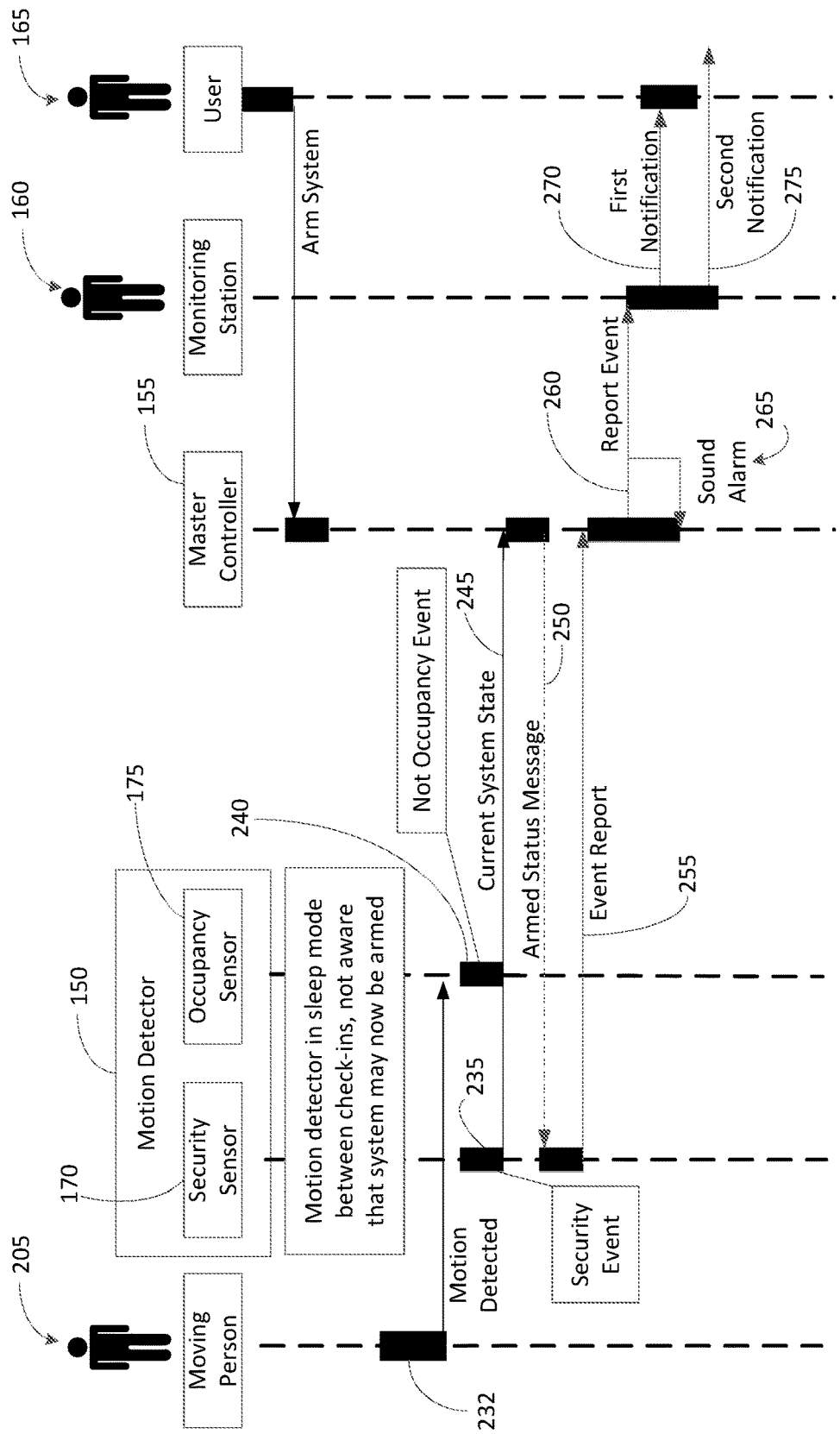

One solution to this problem is to implement more frequent check-ins. However, more frequent check-ins reduce battery life. Accordingly, FIG. 5 illustrates another option to address this problem. As illustrated in FIG. 5, the user 165 changes the current state of the system from a disarmed state to an armed state (for example, through an arm system operation or signal 230 provided to the master controller 155 via the monitoring station 160). After the user 165 arms the system, the motion detector 150 detects the moving person 205 (for example, a detected event 232). In response to the detected event 232, the electronic processor included in point device 30 applies both the "armed mode" logic 235 and the "disarmed mode" logic 240 to identify whether to report the detected event 232 to the master controller 155. In particular, when the logic 235 produces a different result than the logic 240 (for example, the "armed mode" logic 235 indicates that the detected event 232 should be reported and the "disarmed mode" logic 240 indicates that the detected event 232 should not be reported), the electronic processor checks the current state of the system and reports the detected event 232 based on the current state of the system. In some embodiments, when the system is capable of being in more than two different modes, the electronic processor may apply (execute) logic for each available mode and determine a current state of the system when any two results of the logic differ. In this way, the electronic processor determines a current state of the system when the current state impacts the functionality of the point device 30. Similarly, when the logic produces the same result, the point device 30 skips checking the system state (because the current system state does not impact how the point device 30 should process the detected event 232).

For example, when the results of the logic 235 and 240 differ, the electronic processor transmits a current system state query 245 to the master controller 155. In response to the current system state query 245, the master controller 155 transmits a message indicating the current system state, such as an armed status message 250 when the system is in an "armed" mode or state. Accordingly, in response to receiving the armed status message 250, the electronic processor included in the point device 30 identifies that the current state of the system is an armed state and, hence, based on the "armed mode" logic 235, reports the detected event 235 (for example, through an event report 255 provided to the master controller 155). In response to receiving the event report 255, as illustrated in FIG. 5, the master controller 155 may provide the event report 255 to the monitoring station 160 (for example, through a report event signal or message 260), sound an alarm 265 included within the premises, or a combination thereof. Furthermore, the monitoring station 160 may provide a first notification 270 to the user 165, a second notification 275 to the police, or a combination thereof.

Accordingly, the process illustrated in FIG. 5 provides several benefits including providing more reliable detection and reporting, providing consistent latency of event reports, providing quick event reports (for example, within a milliseconds range), reducing the number of check-ins that may extend battery life, reducing memory resource usage, reducing device and system firmware complexity and cost, and limiting user interaction. It should be understood that the process illustrated in FIG. 5 may be performed to identify how to process a detected event for each of a plurality of states of the system of point devices and is not limited to just two states. Furthermore, the process illustrated in FIG. 5 may be used to identify how to process a detected event, which may or may not include reporting the event. For example, the process illustrated in FIG. 5 generally allows a point device to determine whether an updated state of the system is warranted to ensure that the point device operates appropriately or whether a previously-identified state of the system is sufficient.

Thus, embodiments of the invention provide systems and methods for operating a point device included in a system of point devices, such as a security system. The point device may automatically determine the current state of the system of point devices and modify operation accordingly. Performing this functionality at the point device reduces the complexity of the system, improves system installation and configuration, and increases the functionality and versatility of point devices and associated controllers. Using a variety of triggers to initiate system state checks further enhances system versatility. For example, implementing parallel processes internal to the point device 30 that map to different system states (especially for battery powered devices that may enter sleep modes) may further improve system reliability, performance, and usability while reducing complexity and cost. Various features and advantages of the invention are set forth in the following claims.

What is claimed is:

1. A method for operating a point device included in a system of point devices, the method comprising:
   transmitting a query, with a transceiver included in the point device, to at least one device external to the point device for system state information;
   receiving, with the transceiver included in the point device, a response from the at least one device external to the point device to the query for system state information;
   determining, with an electronic processor included in the point device, a current state of the system of point devices based on the response;
   automatically modifying, with the electronic processor included in the point device, operation of the point device based on the current state of the system of point devices;
   tracking a number of changes in the current state of the system of point devices;
   comparing the number of changes in the current state of the system of point devices to a predetermined threshold; and
   when the number of changes in the current state of the system of point devices exceeds the predetermined threshold, automatically triggering a malfunction response.

2. The method of claim 1, wherein determining the current state of the system of point devices includes obtaining the current state of the system of point devices from the response.

3. The method of claim 1, wherein determining the current state of the system of point devices includes determining whether the system of point devices is in at least one selected from a group consisting of an armed state, a disarmed state, an installation state, and a test state.

4. The method of claim 1, wherein automatically modifying operation of the point device includes automatically modifying a mode of operation of the point device, wherein the mode of operation of the point device includes at least one selected from a group consisting of a security sensor mode, an occupancy sensor mode, an installation mode, and a test mode.

5. The method of claim 1, wherein automatically modifying operation of the point device includes at least one selected from a group consisting of disabling a function performed by the point device and modifying an operating parameter of the point device.

6. The method of claim 1, further comprising:
   detecting data with at least one input mechanism included in the point device, wherein the data relates to an environment around the point device,
   wherein automatically modifying operation of the point device is based on the data and the current state of the system of point devices.

7. The method of claim 1, further comprising:
   detecting an event; and
   determining whether to report the event to a master controller based on the current state of the system of point devices.

8. The method of claim 1,
   wherein the malfunction response includes at least one selected from a group consisting of maintaining a current operation of the point device, performing diagnostics on the system of point devices, notifying users via one or more local or remote mechanisms, and switching from a first master controller to a second master controller.

9. A security system comprising:
   a point device included in a system of point devices, the point device including an electronic processor, wherein the electronic processor is configured to
   transmit a query to at least one device external to the point device for system state information,
   receive a response from the at least one device external to the point device to the query for system state information,
   determine a current state of the system of point devices based on the response,
   automatically modify operation of the point device based on the current state of the system of point devices,
   track a number of changes in the current state of the system of point devices,
   compare the number of changes in the current state of the system of point devices to a predetermined threshold,
   when the number of changes in the current state of the system of point devices exceeds the predetermined threshold, automatically trigger a malfunction response, and
   when the number of changes in the current state of the system of point devices does not exceed the predetermined threshold, automatically modify the operation of the point device based on the current state of the system of point devices.

10. The system of claim 9, wherein the electronic processor is further configured to obtain the current state of the system from the response.

11. The system of claim 9, wherein the current state of the system of point devices includes at least one selected from a group consisting of an armed state, a disarmed state, an installation state, and a test state.

12. The system of claim 9, wherein the wherein the malfunction response includes at least one selected from a group consisting of preventing a modification to the operation of the point device, performing diagnostics on the system of point devices, notifying users via one or more local or remote mechanisms, and reporting detected events to a new master controller different from a current master controller.

13. The system of claim 9, wherein the electronic processor is further configured to
 detect an event, and
 determine whether to report the event to a master controller based on the current state of the system of point devices.

14. The system of claim 9, wherein the at least one device external to the point device includes at least one selected from a group consisting of a second point device included in the system of point devices and a master controller.

15. The system of claim 9, wherein the point device further includes at least one input mechanism.

16. The system of claim 15, wherein the at least one input mechanism includes at least one selected from a group consisting of a motion detector, a panic button, a smoke detector, a water sensor, a flow switch, an image sensor, a barometric pressure sensor, and a light sensor.

17. The system of claim 15, wherein the electronic processor is configured to modify the operation of the point device by at least one selected from a group consisting of modifying at least one operating parameter associated with the at least one input mechanism and disabling at least one function performed by the at least one input mechanism.

18. The system of claim 15, wherein the electronic processor is further configured to
 detect data with the at least one input mechanism included in the point device, wherein the data relates to an environment around the point device,
 wherein the electronic processor is configured to modify the operation of the point device based on the current state of the system of point devices and the data.

19. A non-transitory computer readable medium including instructions that, when executed by an electronic processor, causes the electronic processor to execute a set of functions, the set of functions comprising:
 detecting an event with a point device included in a system of point devices;
 determining how to process the event for each of a plurality of states of the system of point devices;
 when the event is not processed the same for each of the plurality of states of the system of point devices,
  transmitting a query from the point device to at least one device external to the point device for system state information,
  receiving a response from the at least one device external to the point device to the query for system state information,
  determining a current state of the system of point devices based on the response,
  and
  processing the event with the point device based on the current state of the system of point devices;
 when the event is processed the same for each of the plurality of states of the system of point devices, processing the event with the point device based on a previously-identified state of the system of point devices without determining the current state of the system of point devices
 tracking a number of changes in the current state of the system of point devices,
 comparing the number of changes in the current state of the system of point devices to a predetermined threshold, and
 when the number of changes in the current state of the system of point devices exceeds the predetermined threshold, automatically triggering a malfunction response.

20. The non-transitory computer readable medium of claim 19, wherein processing the event includes reporting the event.

* * * * *